(12) United States Patent
Torres-Jara (10) Patent No.: US 8,101,904 B2
(45) Date of Patent: Jan. 24, 2012

(54) COMPLIANT TACTILE SENSOR FOR GENERATING A SIGNAL RELATED TO AN APPLIED FORCE

(75) Inventor: Eduardo Torres-Jara, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 199 days.

(21) Appl. No.: 12/709,603

(22) Filed: Feb. 22, 2010

(65) Prior Publication Data

US 2010/0155579 A1 Jun. 24, 2010

Related U.S. Application Data

(63) Continuation of application No. 11/591,709, filed on Nov. 2, 2006, now Pat. No. 7,701,202.

(51) Int. Cl.
*G01D 5/34* (2006.01)
(52) U.S. Cl. ...................... 250/231.1; 250/221
(58) Field of Classification Search ............... 250/231.1, 250/221, 227.22, 551; 73/862.041–862.046; 340/619
See application file for complete search history.

(56) References Cited

U.S. PATENT DOCUMENTS

| | | | |
|---|---|---|---|
| 3,205,323 A | 9/1965 | Deshautreaux | |
| 3,921,108 A | 11/1975 | O'Connor | |
| 5,504,502 A | 4/1996 | Arita et al. | |
| 5,818,037 A * | 10/1998 | Redford et al. | ............... 250/229 |
| 6,635,838 B1 | 10/2003 | Kornelson | |
| 6,937,012 B2 | 8/2005 | Saito | |
| 7,016,263 B2 | 3/2006 | Gueissaz et al. | |
| 7,326,869 B2 | 2/2008 | Flynn et al. | |
| 7,388,574 B2 | 6/2008 | Takatsuka et al. | |
| 2001/0055002 A1 | 12/2001 | Endo | |
| 2004/0080491 A1 | 4/2004 | Takatsuka et al. | |
| 2004/0183778 A1 | 9/2004 | Endo | |
| 2005/0093822 A1 | 5/2005 | Nishino et al. | |
| 2005/0285593 A1 | 12/2005 | Saito | |
| 2006/0050053 A1 | 3/2006 | Takatsuka | |
| 2008/0036456 A1 | 2/2008 | Kishida et al. | |
| 2008/0068008 A1 | 3/2008 | Watson et al. | |

FOREIGN PATENT DOCUMENTS

| | | |
|---|---|---|
| JP | 404172521 | 6/1992 |
| JP | 406035599 | 2/1994 |
| JP | 02005292070 | 10/2005 |

OTHER PUBLICATIONS

Bicchi et al. "Contact Sensing from force measurements". International Journal of Robotics Research, 12(3): pp. 249-262, Jun. 1993.
Hristu et al. "The Performance of a deformable-membrane tactile sensor: basic results on geometrically-defined tasks," Int'l Conf. on Robotics and Automation, 2000.
Hellard et al. "A Robust, Sensitive and Economic Tactile Sensor for a Robotic Manipulator," Proc. 2002 Australian Conf. on Robotics and Automation Auckland, Nov. 27-29, 2002.

(Continued)

*Primary Examiner* — Que T Le
(74) *Attorney, Agent, or Firm* — Sam Pasternack; MIT's Technology Licensing Office (57) ABSTRACT

Tactile sensor. The sensor includes a compliant convex surface disposed above a sensor array, the sensor array adapted to respond to deformation of the convex surface to generate a signal related to an applied force vector.

3 Claims, 5 Drawing Sheets

OTHER PUBLICATIONS

Harmon. "Automated Tactile Sensing," The International Journal of Robotics Research, vol. 1, No. 2, Summer 1982, pp. 3-32.

Howe et al. "Touch Sensing for Robotic Manipulation and Recognition," The Robotics Review 2, MIT Press, Cambridge, MA 1992, pp. 55-112.

Interlink Electronics, Inc. 546 Flynn Road, Camarillo, CA 93012, Integration Guide, 1998, P/N 90-65801Rev. C.

Ritter et al., "A Tactile Sensor System for three-fingered Robot Manipulator," Int. Conf. on Robotics and Automation, 1997.

Voyles et al., "Design of a Modular Tactile Sensor and Actuator Based on an Electronheological gel," Int'l Con. on Robotics and Automation, 1996.

Pencilla Lang. "Design and Prototyping of a Fibre Optic Tactile Array," The Journal of High School Science, Nov. 2002.

Pencilla Lang. "Optical Tactile Sensors for Medical Palpation". Canada-Wide Science Fair, May 2004.

Someya et al., "Comformable, Flexible Large-area Networks of Pressure and Thermal Sensors with Organic Transistor active Matrixes". Proc. of National Academy of Sciences, Aug. 2005.

Torres-Jara, Edward. Obrero: "A Platform for Sensitive Manipulation," In Proceedings of the IEEE-RAS International Conference on Humanoid Robots, 2005.

Chu. "Silicon Three-Axial Tactile Sensor", International Conference on Solid-State Sensors and Actuators, 1995.

* cited by examiner

COMPLIANT TACTILE SENSOR FOR GENERATING A SIGNAL RELATED TO AN APPLIED FORCE

This application is a continuation of application Ser. No. 11/591,709 filed on Nov. 2, 2006 and claims priority thereto.

The United States government has rights in this invention pursuant to NASA contract NNJ05HF82A.

BACKGROUND OF THE INVENTION

This invention relates to tactile sensors and more particularly to a compliant tactile sensor that delivers a force vector with three components.

Tactile sensors are used for robotic manipulation and to sense interactions with human hands or pen-like interfaces. We are motivated to build tactile sensors that are useful for robotic manipulation in unmodeled environments [12]. The numbers in brackets refer to the references appended hereto, the contents of all of which are incorporated herein by reference. These sensors should be capable of detecting when a robotic part (i.e. finger, hand, arm, etc.) comes in contact with any type of object at any incident angle. This feature is very important because in general a robot will not have any prior model of the object and thus have to use its limbs to come into contact and learn about the object. Moreover, the sensor should have a shape that makes it prone to contact.

Current tactile sensors are not good at detecting generalized contact. For example, consider a computer touch pad that uses force resistor sensors (FSR). These pads have high spatial resolution, low minimum detectable force (about 0.1N) and a good force range (7 bits). These features make the sensor work very well when a human finger, a plastic pen or another object with a pointy shape comes in contact. However if one places a larger object or the same pen at a small incident angle, it is very unlikely that these contacts are detected unless the applied force is very large.

The detection is even more difficult when this pad is mounted in a low mechanical impedance robotic finger (such as the one in Obrero [12]). This is because the low mechanical impedance makes the finger deflect when it comes in contact with an object. A tactile sensor on this finger should be able to detect this contact with only a little deflection of the finger, because if the deflection is large, undesired forces are already being applied to the object. Therefore, the sensor needs to be very sensitive and able to detect forces applied from different directions.

Another factor that we consider important for the functionality of the sensor is its shape. The shape should be such that it is physically reachable from a range of directions. In other words, the shape should make the sensor prone to contact. We can observe that in the human skin, there are hairs and ridges that stick out. That is opposed to the design of a traditional tactile sensor whose shape is planar and only normal forces to its surface will be detectable.

Moreover, after the initial contact with an object, the fingers of a robot exert high forces to handle objects. Consequently, the tactile sensors also need to deal with this condition by either handling saturation or having a large operating range. Lastly, a tactile sensor should be able to conform to the object to increase the friction and facilitate manipulation.

Many attempts have been made to implement tactile sensing in robots. There are many technologies used to build sensor arrays: conductive elastomers [11], elastomer-dielectric capacitive [13], optical sensors (surface motion and frustrated internal reflection) [9], piezoelectric [7], acoustic, magnetoelastic, electromagnetic dipoles, silicon micromechanical (mems), and force sensing resistors. A complete review of these technologies can be found in [5]. The performance of these sensors has been measured according to the parameters mentioned in a survey study by Harmon [4]. Those parameters include: spatial and temporal resolution, measurement accuracy, noise rejection, hysteresis, linearity, number of wires, packing, and cost. However, it is not clear if any of these designs are useful for manipulation because little attention has been given to the data produced by these sensors [5].

Most sensors are essentially a flexible elastic skin, coupled with a method of measuring the deformations caused by the applied force. In [3], an IR emitter and receiver are placed inside cavities of an elastic skin. As the skin deforms, the cavity shape changes resulting in change of the received signal. However, the results on pressure sensitivity are not shown, and the sensor is not able to distinguish the direction from which the pressure is applied. In [9] the idea is taken one step farther. A full matrix of such sensors is developed and analyzed, light being routed in and out of the cavities using a matrix of optical fibers, taking out some of the bulk of the sensors. Again, only scalar data is obtained.

An interesting idea for a tactile sensor is described by both Lang [10] and Hristuy [2]. Here the finger is a white flexible membrane with a pattern of black dots or lines drawn on the inside. A light source and a CCD camera are placed inside the finger facing the patterns. Pressure on the membrane results in deformations that are detected by analyzing the CCD images. Significant processing power is required, and overall the sensor is quite big and expensive.

Another approach for the sensing tactile forces has been to use joint torque and force information to recover the normal forces [1] instead of using superficial sensors. Nevertheless, this approach is only able to detect resulting forces as opposed to distributions. Tactile sensors also have been developed using organic materials to print circuits [11]. This approach creates flexible transistors that can be used to develop a flexible skin with a high density of touch sensors that can easily be wrapped around a manipulator's fingers. The sensor used is a rubber sheet that changes conductivity with deformation. The transistors' role is to locally amplify the signal and connect it to the matrix of wires that routes the signals to the controller. While the idea has great potential to be developed, so far the results are modest in terms of sensitivity, as they only detect force applied in one direction and the organic technology still needs to be perfected (they are sensitive to oxidation).

A promising tactile sensor is described by Chu [13]. Essentially the skin is padded with rubber cones each placed on top of four capacitive force sensors. Having four sensors under each cone makes the detection of both the perpendicular as well as the sideways force possible. The results were very encouraging with sub-gram forces detected. However, the process requires a custom silicon wafer to be made (for the capacitive sensors) and therefore might be prohibitively expensive.

A unidirectional capacitive sensor is described by Voyles [8]. Here an electrorheological gel is placed between the inner and outer membrane padded with electrical contacts. The inner membrane is a hard material (like plastic) while the outer material is elastic (rubber). Again, pressure changes the relative position of the contacts which causes a change of the capacitance. One interesting property of this gel is the change in viscosity with the electric field applied, opening doors for the adaptive skin strength to the task. Unfortunately no quantitative data on the sensor are published.

SUMMARY OF THE INVENTION

According to one aspect the invention is a compliant convex surface disposed above a sensor array, the sensor array adapted to respond to deformation of the convex surface to generate a signal related to an applied force vector. In a preferred embodiment, the convex surface is a dome having a flat top and sides that are sections of a sphere. The convex surface may be hollow.

In a preferred embodiment, deformation of the convex surface is measured by displacement of the center of the convex surface. In this embodiment, the convex surface includes a magnet at its center and the sensor array includes at least three non-co-linear sensors that respond to magnetic field intensity. Four sensors are preferred arranged in a rectangular array. Suitable sensors are hall effect sensors.

In this embodiment the differences of the signals measured by the sensors relate to lateral displacement of the convex surface and the average of the signals relate to normal displacement. A suitable material for the convex surface is silicone rubber. In another embodiment, the dome is a spherical surface intersected by a cube.

In yet another preferred embodiment, the convex surface deformation is detected optically. In this embodiment, the sensor array has one light emitter and 4 photo-transistors. The total power reflected gives the normal deformation of the dome and the differences between the sensor signals gives the lateral deformation.

BRIEF DESCRIPTION OF THE DRAWING

FIG. 2b is a graph of displacement vs. load for the dome of FIG. 2a.

FIG. 3b is a graph of displacement vs. load showing both lateral and normal displacement for the dome of FIG. 3a.

DESCRIPTION OF THE PREFERRED EMBODIMENTS

In designing the sensor disclosed herein we considered the lessons learned in the robot Obrero [12]. Obrero's hand previously used commercial FSR's pads of high spatial resolution (1000 dot per square inch); however, these sensors presented the problems described above: flat shape, rigidness and low friction. Moreover, the tactile sensors did not provide any information when they came in contact with a given object in general. Even though the minimum force to produce a reading is 0.098N (as stated in [6]), this only works when applied in a particular direction and with a particular probe (i.e., a finger).

In order to address these problems, we analyzed human skin as a source of inspiration. We can observe that skin surface shape is curved. This curve deforms when it comes in contact with an object; the innervations on the sides of the skin detect deformation which is correlated with the force applied. The deformation also increases the surface of contact between the skin and the object, thereby increasing the friction. See, "Principles of Neural Science," by Eric R. Kandel, James H. Schwartz and Thomas M. Jessell.

Based on this mechanism, we build dome-like shapes using, for example, silicone rubber and measure magnitudes related to the deformation to determine the forces applied. We started by analyzing the behavior of a dome in simulation.

Figure 1A:
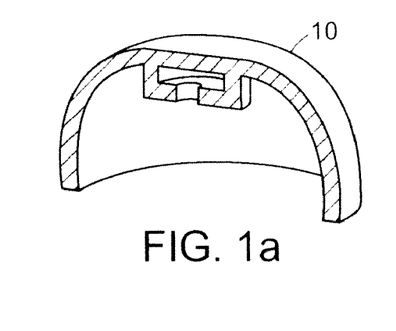
FIG. 1a is a perspective view of a dome according to the invention.
Figure 1B:
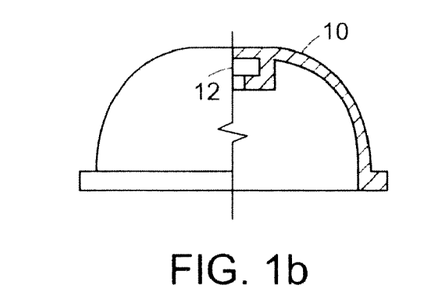
FIG. 1b is a cross-sectional view of a dome according to an embodiment of the invention.

In order to determine the relation between the load applied to a dome 10 and its deformation, a model for finite element analysis (FEA) was implemented in ADINA 8 (see FIG. 1a). The specifications of the dome 10 are shown in FIG. 1b. The dome 10 has a flat surface on top and a circular profile on the sides. Under the flat surface there is a magnet 12 that is used for detecting the deformation. The magnet 12 was modeled as a rigid object.

Figure 2A:
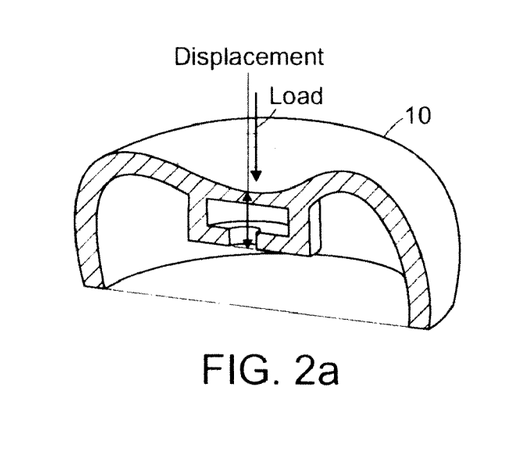
FIG. 2a is a perspective view of a simulated/modeled dome deformed under a normal force acting on the top of the dome.
Figure 2B:
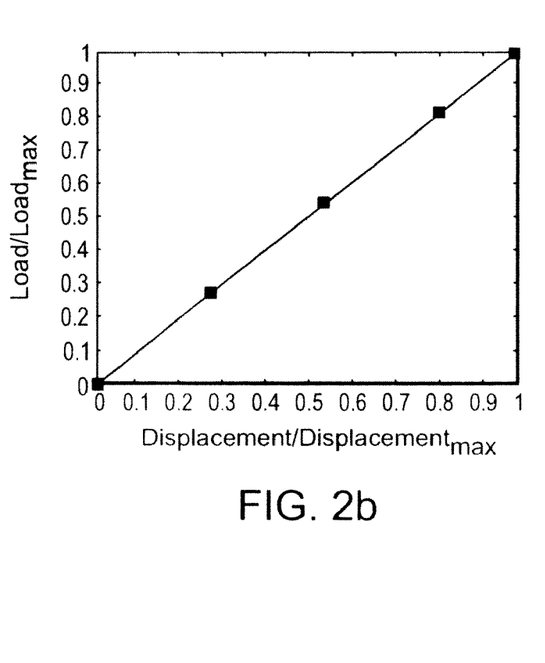

The two types of forces acting on the dome were evaluated: a normal force acting on the top of the dome 10 and a force acting at 45 degrees away from the normal at the top of the dome. The base of the dome was fixed. The sensor material was assumed to be isotropic. The stress and strain constitutive relation was assumed to be linear due to the small loads applied to the dome. The values for the material properties were modulus of Young $1.5 \times 10^6$ Pa, Poisson ratio 0.45 and density of $1100 \, \text{kg/m}^3$. For the first load case, FIG. 2a, normal force was applied to the top and the dome downwards displacement as a function of the applied load was determined. The maximum dome displacement is constrained by the base of the sensor which is at 5 mm from the top of the dome. It was determined that the maximum displacement is achieved under a load of 0.147N. The resulting dome displacement due to a load is shown in FIG. 2b.

Figure 3A:
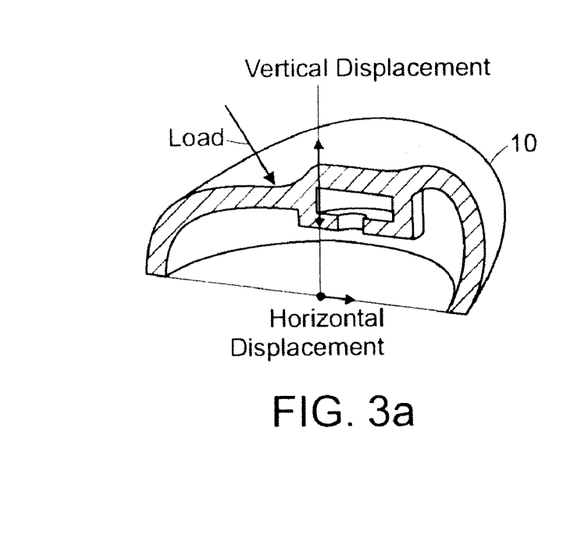
FIG. 3a is a perspective view of a simulated/modeled dome deformed by a load acting 45° from the normal.
Figure 3B:
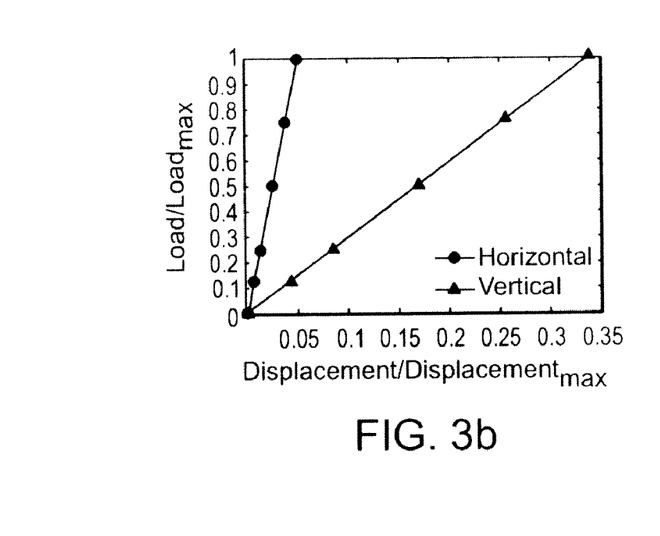

Similarly, for the case where the force acts 45 degrees away from the normal at the top of the dome, the relations of the lateral displacement vs. load and the normal displacement vs. load were determined. The lateral displacement is measured from the center of the dome. The normal displacement is measured from the top of the dome (when no load is applied) downwards. The displacements are normalized by the maximum lateral displacement of 7.5 mm and the maximum normal displacement of 5 mm. The load is normalized by the maximum normal load of 0.147N. FIGS. 3a and 3b illustrate the deformed geometry and the load/displacement relations respectively.

The finite element analysis shows that there is a linear relation between the displacement and load and that the dome can detect forces acting at various locations of its surface. Parameters that have not been explored are the dome thickness and curvature; these parameters should allow tuning of the sensor to detect a force.

Figure 4A:
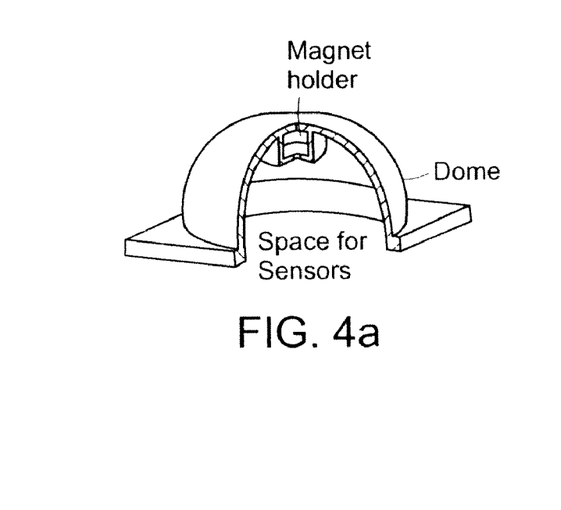
FIG. 4a is a perspective view of a dome showing a magnet holder.
Figures 4B, 4C:
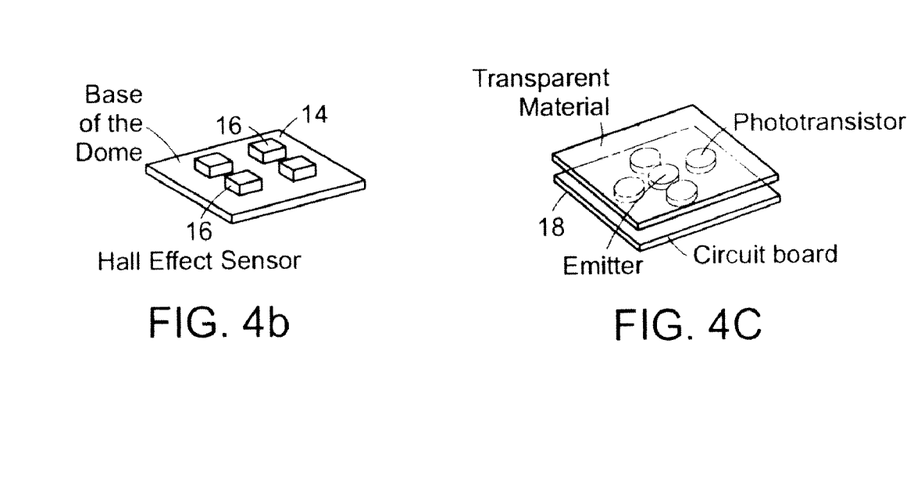
FIG. 4b is a perspective view of a magnetic sensor array.
FIG. 4c is a perspective view of a circuit board using light to measure deformation.

The dome shape shown in FIGS. 1 and 4 was used as the basic shape for the sensors. This dome deforms when either lateral or normal forces are applied as discussed above. The force needed to deform the dome is determined by the structure and the material used to build the sensor. According to the FEA, there is a linear relation between the displacement and the load. Given that the FEA does not cover all the possibilities, this linear relation might not hold for all the forces applied. However, we can assume that measuring the displacement of the center of the dome will give us a reasonable estimation of the forces applied.

In the design process, we considered a number of methods for determining the displacement of the center of the dome, i.e. using magnetic, optical, and pressure sensors. We chose to use the magnetic approach in our primary design and evaluation. We also implemented the optical method and show some preliminary evaluations below. Lastly, we implemented and discussed the pressure method. In the following section, we describe each method.

Figure 10A:
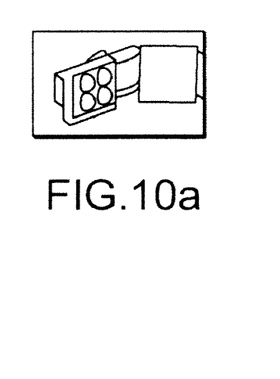
FIG. 10a is a perspective view of a four dome tactile sensor mounted in the finger tip of a robot.
Figure 10B:
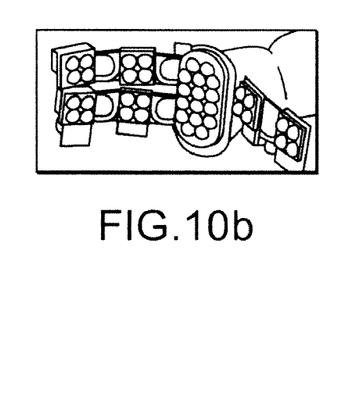
FIG. 10b is a perspective view of the hand of a robot with eight domes mounted in each of its three fingers and sixteen domes on its palm.

1) Magnetic: In this approach, we embed a magnet 12 in the top of the dome. The base of the dome is glued to a printed circuit board (PCB) 14. The magnetic field of the magnet 12 is detected by 4 hall effect sensors 16 on the PCB 14 (FIG. 4b). The difference of the signals detected by the sensors will give a rough approximation of lateral displacement and the average of the signals will give the normal displacement. When the top of the dome reaches the base of the dome, no more displacement will be allowed and the sensor saturates. Additional sensors can be placed in the PCB 14 to measure beyond this saturation limit. Each one of the hall effect sensors 16 is multiplexed and read through an A/D converter. This converter is part of a 16F876A PIC microcontroller that transmits the information via RS232 using ASCII code. Four of these domes were used in each of the phalanges of the fingers in the robot Obrero (see FIG. 10). Obrero's hand has 24 domes in its fingers and 16 in its palm.

Figure 5A:
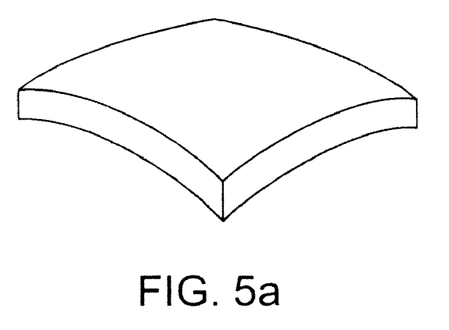
FIG. 5a is a perspective view of another dome shape for use in an embodiment of the invention.
Figure 5B:
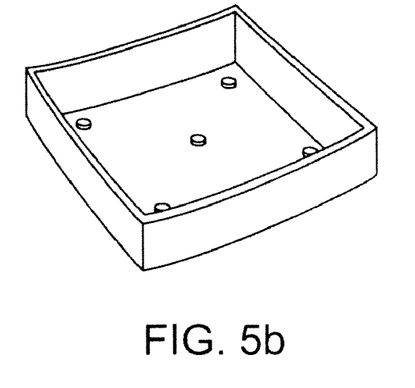
FIG. 5b is a perspective view of the dome of FIG. 5a showing magnet locations.

It is important to note that the sensitivity of the sensor can be controlled by changing the shape of the domes. More easily deformable structures can be created to satisfy a given application. In FIGS. 5a and 5b, we present an example of a more sensible sensor that consists of only one dome as opposed to four as in the previous case. There are four magnets embedded in the structure which allows detection of the deformation. This structure is easily deformable because a larger surface is supported by farther away walls. However, independently of the shape, the problem with this sensing method is that it is affected by metallic objects. Therefore we also experimented with using light and pressure for detecting the deformation.

2) Optics: The dome used for optical detection is like the one shown in FIG. 4a except that the magnet holder was removed. The base of the dome is glued to a printed circuit board (PCB) 18 which has one light emitter and 4 phototransistors as shown in FIG. 4c. The total power reflected gives the normal deformation of the dome and the difference between the sensors signals gives the lateral deformation. A transparent layer was added to prevent the dome from completely blocking the light emitter and guarantee a monotonic reading of the light reflection. This layer will also be the limit of the normal displacement of the dome. The force that produces such deformation is the saturation threshold of the sensor. Therefore, this layer will deal with forces greater than the saturation limit. As in the previous case, the output of each of the phototransistors goes to a multiplexor connected to an A/D converter which is part of a 16F876A PIC microcontroller.

3) Pressure Another implementation was to seal the domes with air in their interior and place a pressure sensor on their base. The pressure was measured using a ICS1451 sensor. The drawback of this approach is that it does not differentiate horizontal from vertical displacement. Moreover, pressure sensors need more complicated and more expensive electronics than the previous methods. Therefore, we did not completely characterize this type of sensor.

Figure 6A:
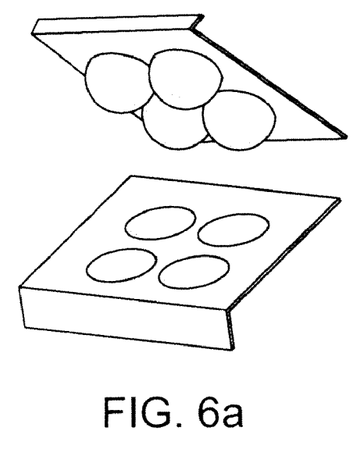
FIG. 6a is a perspective view of a mold used to build four sensors.
Figure 6B:
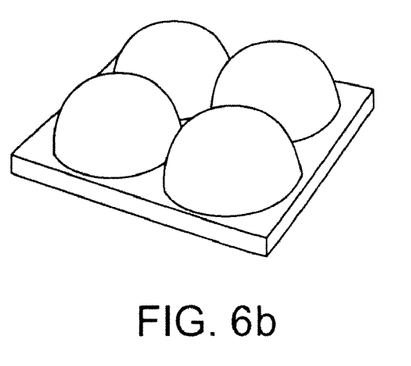
FIG. 6b is a perspective view of four domes molded using silicone rubber.

The sensors were built using Freeman V-1062 room-temperature, condensation-cured silicone, which is very simple to use without expensive tooling. This material was chosen because of its very low hardness (14 Shore A), good tensile strength (545 PSI) and tear resistance (120 ppi). The molds were constructed using a 3D printer. In FIG. 6a we see one of those molds and the resulting material in FIG. 6b. Those of ordinary skill in the art will recognize that other compliant materials may be used to make the sensors of the invention.

As mentioned above, we implemented and evaluated two approaches for determining the displacement of the center of the dome, i.e. using magnetic and optical sensors. We will now present the experimental results of our primary design using the magnetic approach. We then show some preliminary results of embodiments using optical sensors.

1) Magnetic: We apply normal and lateral forces and record the displacement of the center of the dome. The displacement is determined by measuring the intensity of the magnetic field that reaches the hall effect sensors 16 in the base of the dome. The configuration of the hall effect sensors are shown in FIG. 4b.

Figure 7:
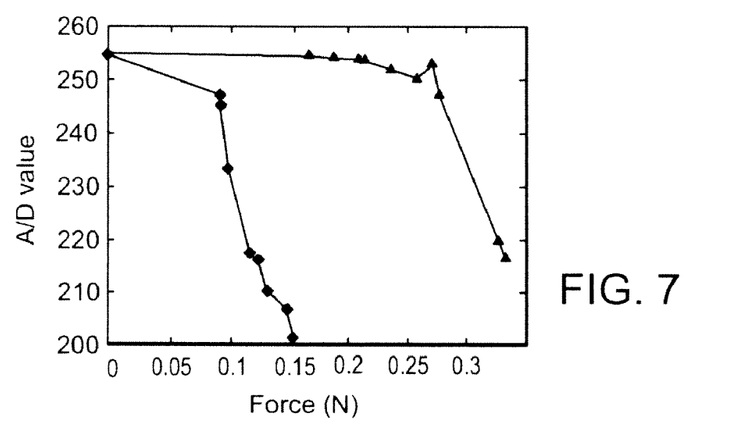
FIG. 7 is a graph showing the response of a magnetic sensor to a normal forces.

We first evaluated the response of the sensor to normal forces. Different weights were applied to the top of the dome using plastic holders. Two cases were considered; holders with contact surfaces smaller and larger than the top surface of the dome. FIG. 7 shows the average of the reading of 4 hall effect sensors 16 as the normal forces applied change. The reading of each hall effect sensor is obtained using a 8 bit A/D converter. The lines with circular and triangular marks show, respectively, the responses to weights whose contact surfaces are smaller and larger than the circular surface of the dome.

We observe that the readings decrease monotonically in each of the two cases. The relation is not linear as shown in the simulation because the relation between the intensity of the magnetic field and the distance to the hall effect sensors is not linear.

These two different behaviors are determined by the shape of the dome which is composed of a spherical part with a flat circular surface on the top. If the sensor shape were a semisphere it would be more difficult to deform and if it were a plane it would be easier. The current one is a combination of both of them. This shape makes the deformation of the sensor greater when it comes in contact with pointy objects. In the simulation analysis, only the case with a contact surface smaller than the top of the dome was considered since we wanted to have a general idea of the behavior of the structure.

In order to determine the response to lateral forces, an array of four domes (see FIG. 6b) was placed upside down against a flat surface and weight was applied on top of them. These provide a minimum normal force that remained constant. The motion of the array was restricted to one direction by placing fixed plates on two opposed sides of the array. A lateral force was applied by a cable attached to the side of the array of 4 domes in the unrestricted direction. The cable was routed through a pulley and attached to a weight. The weight applied determines the pulling force.

Figure 8:
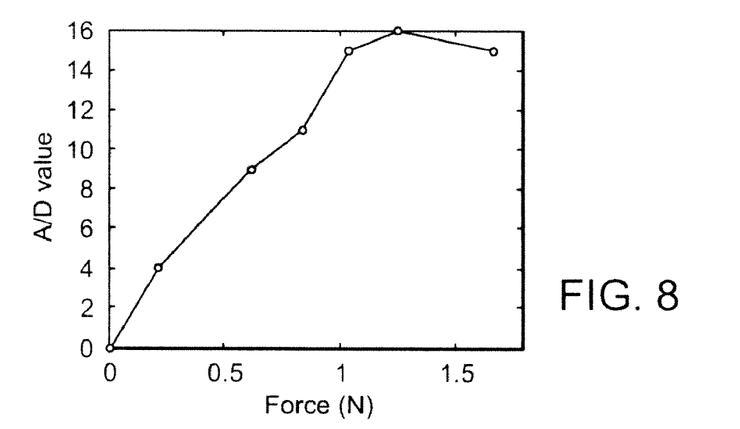
FIG. 8 is a graph showing the response of a magnetic sensor to lateral forces.

The lateral displacement is determined by computing the difference among the readings of the hall effect sensors. The sensors whose output is greater have the magnet closer to them. FIG. 8 shows the computed difference between the readings of two groups of two sensors for a lateral force of known direction. We can observe that the response curve is roughly monotonic. The minimum normal force detected by the magnetic sensor is 0.094N. The maximum deflection is obtained when a force of 0.147N is applied to the center of the circle on top of the dome and the weight was smaller than the dome.

Figure 11:
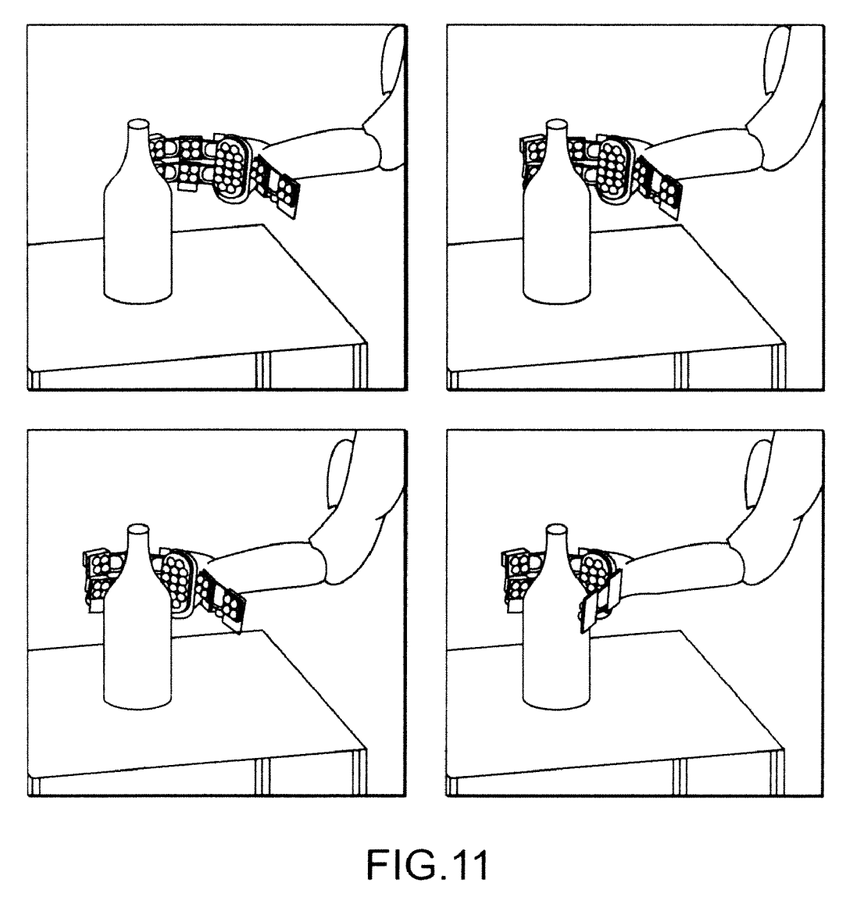
FIG. 11 are perspective views of a robot moving its hand into contact with a bottle.

Certainly many tactile sensors have good sensitivity but they may not necessarily work well on a real robot. These sensors were mounted on the fingers of Obrero's hand. (See FIG. 10.) In FIG. 11 we show a sequence of the robot approaching a cylindrical object whose physical characteristics are: mass=0.179 Kg, diameter=92 mm, height=216 mm. When Obrero performs a blind (no vision involved) exploration task and touches the object, it is not pushed or tilted. The tactile sensors deform and conform to the surface of the object. Consequently the hand touches the object gently. Regrettably, it is difficult to see all these effects in the figure.

Figure 9:
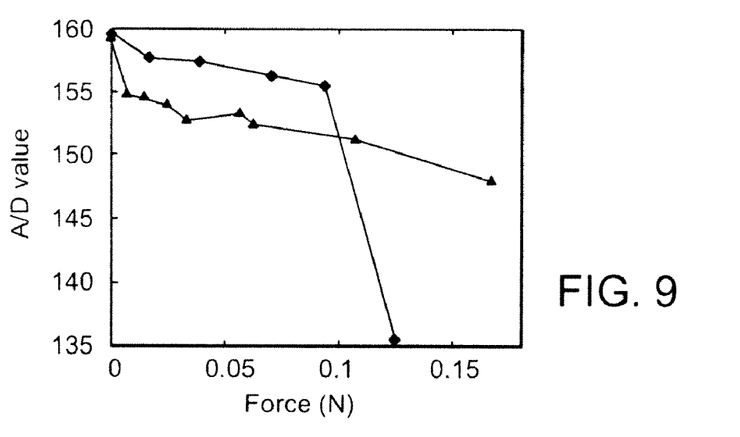
FIG. 9 is a graph showing the response of an optical sensor to a normal force.

2) Optic: As mentioned above, the second method used to measure the deformation was optic. A LED and 4 phototransistors were placed in the base of the dome (FIG. 4c). The same two cases as in the magnetic method were considered. FIG. 9 shows the results of this evaluation. The values on the vertical axis are the average of the readings from 4 phototransistors. As in the magnetic case, the lines with circular and triangular marks show, respectively, the responses to weights smaller and larger than the circular surface of the dome. The response to lateral forces was not evaluated for this version.

We have disclosed in this application the design, analysis, construction and experimental evaluation of a biologically-inspired tactile sensor. Our sensor has five key properties that make it better suited for manipulation than previous designs. It conforms to the surfaces with which it comes in contact by elastic deformation, enabling the grabbing of a wider range of objects. Its shape makes it prone to contact which create the opportunity to sense the environment. It is sensitive to both normal and lateral forces, providing better feedback to the host robot about the object to be grabbed. It has a high sensitivity, enabling its use in state of the art manipulation fingers, which typically have low mechanical impedance—in order to be very compliant. We showed the integration of our sensor with Obrero's hand Fig. [12]. Last, but not least, the construction of the sensor is simple, using inexpensive technologies like silicone rubber molding and standard stock electronics.

While some of these features are present in previous designs, none of previous sensors has encompassed all of them. Additionally most of the previous sensors are not fully characterized experimentally, and therefore estimating their usefulness in robotic manipulation is difficult.

REFERENCES

[1] A. Bicchi, J. K. Salisbury, and D. L. Brock. Contact sensing from force measurements. *International Journal of Robotics Research*, 12(3):249-262, June 1993.

[2] Roger W. Brockett Dimitris Hristuy, Nicola Ferrier. The performance of a deformable membrane tactile sensor basic results on geometrically defined tasks, *Int'l Conf. on Robotics and Automation*, 2000.

[3] Andrew Russell Greg Hellard. A robust, sensitive and economical tactile sensor for a robotic manipulator, *Australian Conference on Robotics and Automation*, 2002.

[4] L. D. Harmon. Automated tactile sensing, *International Journal of Robotics Research*, 1(2):3-32, 1982.

[5] Robert D. Howe and Mark R. Cutkosky. *Touch Sensing for Robotic Manipulation and Recognition*, pages 55-112, The Robotics Review 2, O Khatib, J. J. Craig and T. Lozano-Perez, MIT Press, Cambridge, Mass., 1992.

[6] Interlink Electronics, Inc., 546 Flynn Road, Camarillo, Calif. 93012, *Integration Guide*, 1998, P/N 90-65801 Rev. C.

[7] Helge Ritter Jan Jockusch, Jorg Walter. A tactile sensor system for a three-fingered robot manipulator. *Int. Conf on Robotics and Automation*, 1997.

[8] Ricvhard M. Voyles Jr., Gary Fedder, and Pradeel K. Wlosla. Design of a modular tactile sensor and actuator based on an electronheological gel, *Int'l Conf on Robotics and Automation*, 1996.

[9] Pencilla Lang. Design and prototyping of a fibre optic tactile array. *The Journal of High School Science*, November 2002.

[10] Pencilla Lang. Optical tactile sensors for medical palpation. *Canada-Wide Science Fair*, May 2004.

[11] Takao Someya, Yusaku Kato, Tsuyoshi Sekitani, Shingo Iba, Yoshiaki Noguchi, Yousuke Murase, Hiroshi Kawaguchi, and tAkayasu Sakurai. Conformable, flexible large-area networks of pressure and thermal sensors with organic transistor active matrixes. *Proc. of National Academy of Sciences*, August 2005.

[12] Edward Torres-Jara. Obrero: A platform for sensitive manipulation. In *Proceedings of the IEEE-RAS International Conference on Humanoid Robots*, 2005.

[13] S. Middelhoek Z. Chu, P. M. Sarro. Silicon three-axial tactile sensor, *International Conference on Solid-State Sensors and Actuators*, 1995.

It is recognized that modifications and variations of the invention disclosed herein will be apparent to those with ordinary skill in the art and it is intended that all such modifications and variations be included within the scope of the appended claims.

What is claimed is:

1. Tactile sensor comprising:
a compliant convex surface defining a dome with a hollow interior and having a linear relation between displacement of the convex surface and an applied force thereon; and
an array disposed within the dome including a light emitter and a plurality of light sensors that respond to light intensity from the emitter, the array responding to deformation of the convex surface to generate a signal related to the applied force thereon.

2. The sensor of claim 1 wherein the array includes four phototransistors.

3. The sensor of claim 2 wherein the four phototransistors surround the light emitter.

* * * * *